United States Patent
Lin

(10) Patent No.: US 8,857,853 B2
(45) Date of Patent: Oct. 14, 2014

(54) MODULAR VEHICLE CHASSIS FRAME

(71) Applicant: Kwang Yang Motor Co., Ltd., Kaohsiung (TW)

(72) Inventor: Chuang-Hsiung Lin, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 0 days.

(21) Appl. No.: 14/082,298

(22) Filed: Nov. 18, 2013

(65) Prior Publication Data

US 2014/0138941 A1    May 22, 2014

(30) Foreign Application Priority Data

Nov. 20, 2012  (TW) .............................. 101143250 A

(51) Int. Cl.
| | |
|---|---|
| B62D 21/11 | (2006.01) |
| B62D 21/12 | (2006.01) |
| B62D 21/02 | (2006.01) |
| B62D 63/02 | (2006.01) |
| B62D 21/07 | (2006.01) |
| B62D 21/14 | (2006.01) |
| B62D 25/20 | (2006.01) |
| B62D 27/02 | (2006.01) |
| B62D 23/00 | (2006.01) |
| B62D 65/04 | (2006.01) |

(52) U.S. Cl.
CPC ................ *B62D 21/12* (2013.01); *B62D 21/02* (2013.01); *B62D 63/025* (2013.01); *B62D 21/07* (2013.01); *B62D 21/14* (2013.01); *B62D 25/2009* (2013.01); *B62D 27/023* (2013.01); *B62D 23/005* (2013.01); *B62D 65/04* (2013.01); *B62D 27/02* (2013.01)

USPC .................... 280/785; 280/788; 280/124.109; 296/193.07; 296/204

(58) Field of Classification Search
CPC ........ B62D 21/02; B62D 21/07; B62D 21/11; B62D 21/12; B60G 2204/15; B60G 2206/604
USPC .......... 180/311, 312, 908; 280/785, 788, 792, 280/795, 797, 800, 124.109; 296/193.04, 296/193.07, 204
See application file for complete search history.

(56) References Cited

U.S. PATENT DOCUMENTS

| | | | | |
|---|---|---|---|---|
| 696,288 | A * | 3/1902 | White | 280/124.109 |
| 1,493,736 | A * | 5/1924 | Collins | 280/796 |
| 1,954,637 | A * | 4/1934 | Linn | 280/794 |
| 2,107,382 | A * | 2/1938 | Maddock | 280/796 |
| 2,173,525 | A * | 9/1939 | Wallace | 280/796 |
| 2,901,266 | A * | 8/1959 | Lindsay | 280/785 |
| 4,386,792 | A * | 6/1983 | Moore et al. | 280/781 |
| 5,561,902 | A * | 10/1996 | Jacobs et al. | 29/897.2 |
| 5,915,727 | A * | 6/1999 | Bonnville | 280/788 |

(Continued)

*Primary Examiner* — Paul N Dickson
*Assistant Examiner* — Laura Freedman
(74) *Attorney, Agent, or Firm* — Whyte Hirschboeck Dudek S.C.

(57) ABSTRACT

A modular vehicle chassis frame includes: two longitudinal bar pieces having front and rear end portions and a plurality of engaging portions; two front connecting members; two rear connecting members; two terminal bar pieces, one of which is connected to the front end portions of the longitudinal bar pieces through the front connecting members, and the other one of which is connected to the rear end portions of the longitudinal bar pieces through the rear connecting members; and a plurality of crossbar pieces that extend transversely to the longitudinal bar pieces. Each of the crossbar pieces extends through two aligned ones of the engaging portions respectively of the longitudinal bar pieces.

10 Claims, 8 Drawing Sheets

(56) References Cited

U.S. PATENT DOCUMENTS

| | | | | |
|---|---|---|---|---|
| 6,003,935 A * | 12/1999 | Kalazny | | 296/204 |
| 6,010,155 A * | 1/2000 | Rinehart | | 280/781 |
| 6,299,210 B1 * | 10/2001 | Ruehl et al. | | 280/800 |
| 6,412,818 B1 * | 7/2002 | Marando | | 280/781 |
| 7,192,081 B2 * | 3/2007 | Tijerina et al. | | 296/205 |
| 7,325,866 B2 * | 2/2008 | Horton et al. | | 296/205 |
| 7,389,844 B2 * | 6/2008 | Van Der Bijl | | 180/291 |
| 7,422,241 B2 * | 9/2008 | Schmaranzer et al. | | 280/781 |
| 2002/0162224 A1 * | 11/2002 | Gabbianelli et al. | | 29/897.2 |
| 2009/0267337 A1 * | 10/2009 | Siekaup et al. | | 280/781 |

* cited by examiner

US 8,857,853 B2

MODULAR VEHICLE CHASSIS FRAME

CROSS-REFERENCE TO RELATED APPLICATION

This application claims priority of Taiwanese Application No. 101143250, filed on Nov. 20, 2012.

BACKGROUND OF THE INVENTION

1. Field of the Invention

This invention relates to a modular vehicle chassis frame for a vehicle.

2. Description of the Related Art

FIGS. 1 and 2 illustrate a conventional vehicle frame 1 for small and low speed vehicles, such as a golf cart, an All Terrain Vehicle (ATV), and a Universal Vehicle (UV). The vehicle frame includes a front suspension frame part 11 adapted to support a front suspension mechanism (not shown) thereon, a rear suspension frame part 12 adapted to support a rear suspension mechanism (not shown) thereon, and a chassis frame part 13 that includes two main bar pieces 131, a plurality of crossbar pieces 132, and a front piece 133. Each of the main bar pieces 131 has a first segment 1311, a second segment 1313, and a middle segment 1312 that is inclined to and that extends between the first and second segments 1311, 1313. Since each of the main bar pieces 131 is a single piece, manufacturing of the main bar pieces 131 for different wheel bases (a distance between two centerlines of front and rear wheels of the vehicle) and/or for different sizes of the rear suspension mechanism requires different sizes of hydroforming molds or dies for hydroforming the main bar pieces 131, which results in an increase in the manufacturing costs. In addition, manufacturing of the front piece 133 requires other hydroforming molds or dies that are different from the mold used for forming the main bar pieces 131, which further results in an increase in the manufacturing costs.

SUMMARY OF THE INVENTION

Therefore, an object of the present invention is to provide a modular vehicle chassis frame that can overcome the aforesaid drawbacks associated with the prior art.

According to this invention, there is provided a modular vehicle chassis frame that is adapted to support front and rear suspension mechanisms of a vehicle. The modular vehicle chassis frame comprises: two longitudinal bar pieces that extend linearly in a first direction and that are opposite to each other in a second direction which is transverse to the first direction, each of the longitudinal bar pieces having front and rear end portions and a plurality of engaging portions that are spaced apart from one another in the first direction; two front connecting members; two rear connecting members; two terminal bar pieces, one of which is connected to the front end portions of the longitudinal bar pieces through the front connecting members and is adapted to be connected to and aligned with the front suspension mechanism in a third direction transverse to the first and second directions, and the other one of which is connected to the rear end portions of the longitudinal bar pieces through the rear connecting members and is adapted to be connected to and aligned with the rear suspension mechanism in the third direction, at least a portion of each of the front connecting members overlapping the respective one of the front end portions of the longitudinal bar pieces and said one of the terminal bar pieces in the second direction, at least a portion of each of the rear connecting members overlapping the rear end portions of the longitudinal bar pieces and the other one of the terminal bar pieces in the second direction; and a plurality of crossbar pieces that extend in the second direction. Each of the crossbar pieces extends through two aligned ones of the engaging portions respectively of the longitudinal bar pieces which are aligned with each other in the second direction.

BRIEF DESCRIPTION OF THE DRAWINGS

In drawings which illustrate an embodiment of the invention.

DETAILED DESCRIPTION OF THE PREFERRED EMBODIMENT

Figure 1:
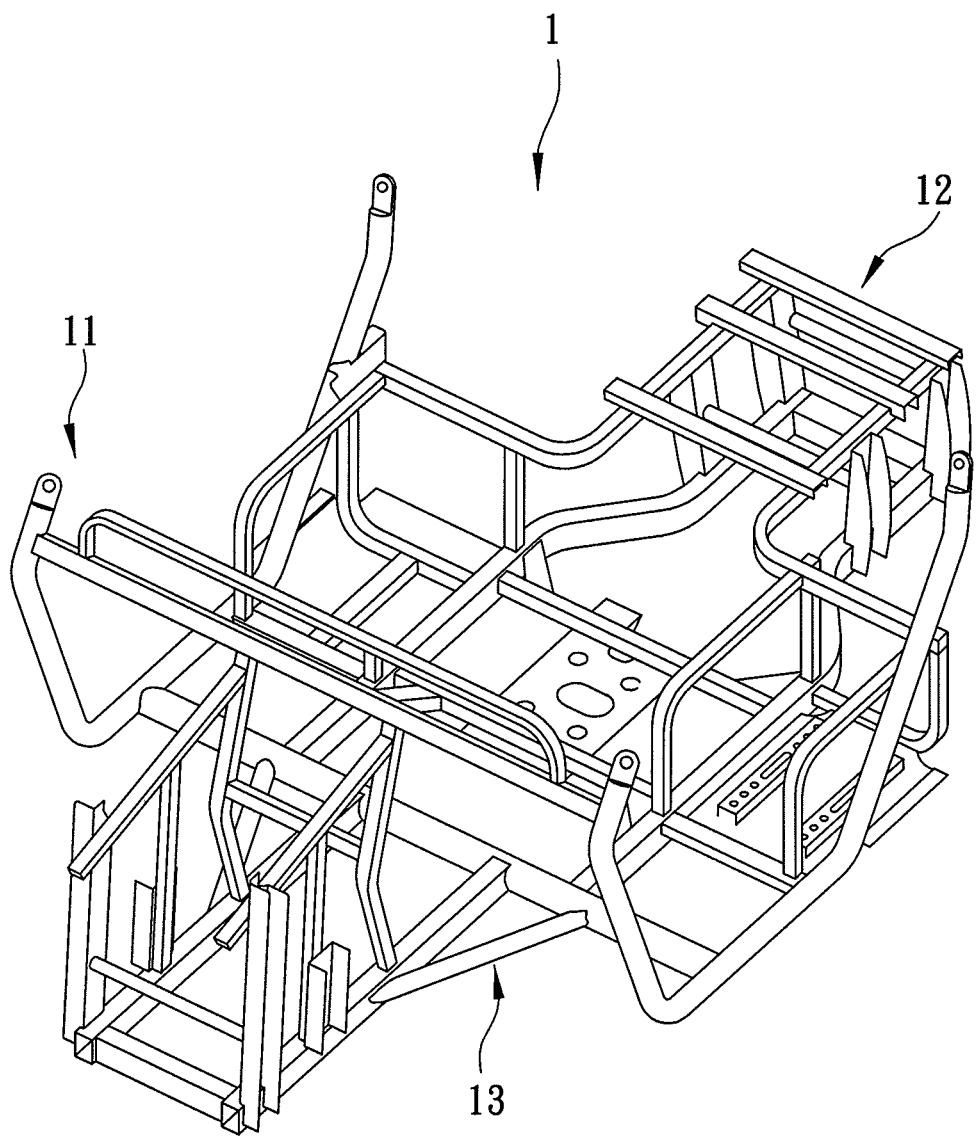
FIG. 1 is a perspective view of a conventional vehicle frame.
Figure 2:
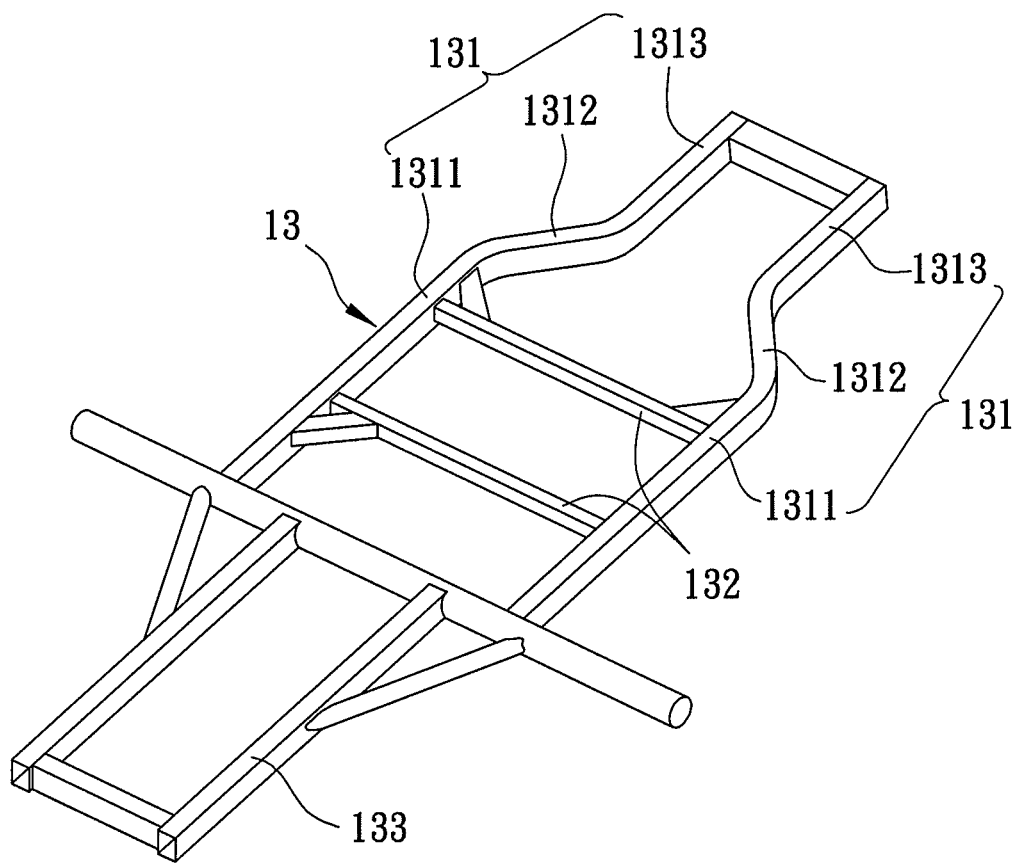
FIG. 2 is a perspective view of a chassis frame part of the conventional vehicle frame.
Figure 3:
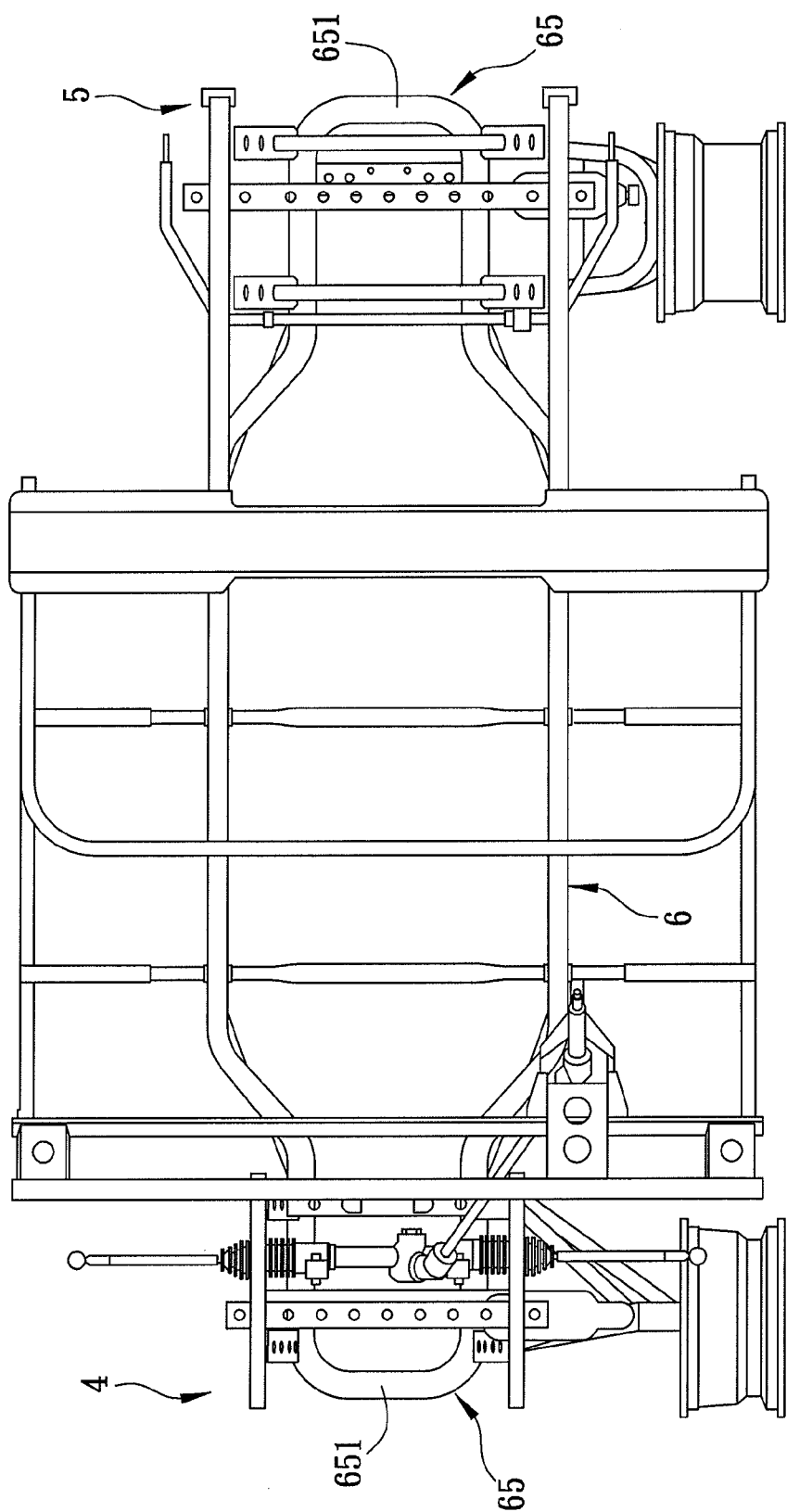
FIG. 3 is a schematic top view of a modular vehicle chassis frame of the preferred embodiment according to the present invention.
Figure 4:
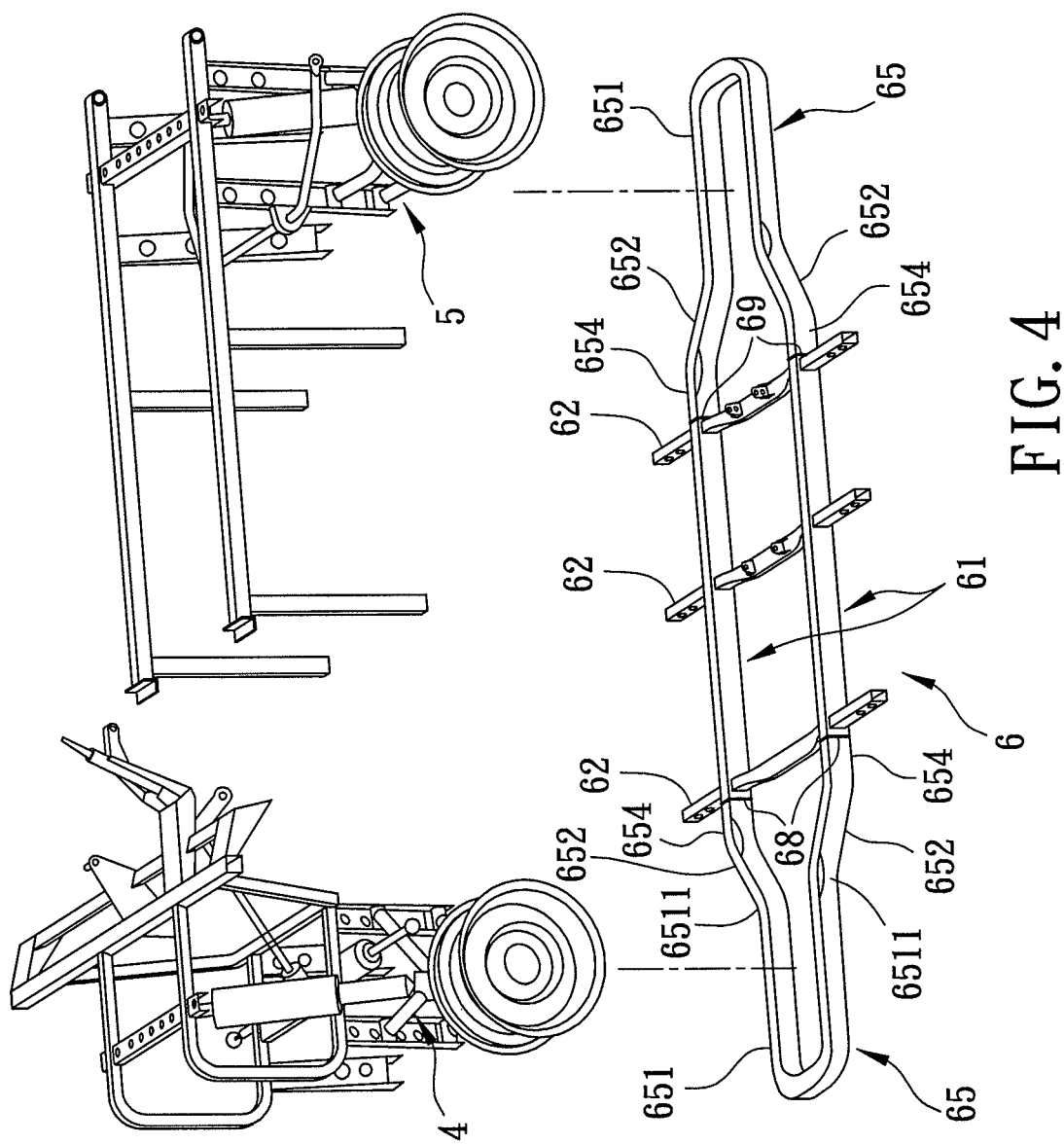
FIG. 4 is a partly exploded perspective view of the preferred embodiment.

FIGS. 3 to 6 illustrate the preferred embodiment of a modular vehicle chassis frame 6 according to the present invention. The modular vehicle chassis frame 6 is adapted to support front and rear suspension mechanisms 4, 5 of a vehicle.

The modular vehicle chassis frame 6 includes two identical longitudinal bar pieces 61 extending linearly in a first direction, two identical terminal bar pieces 65, and a plurality of identical crossbar pieces 62 extending in a second direction transverse to the first direction. The longitudinal bar pieces 61 are symmetrically disposed, and are opposite to each other in the second direction. Each of the longitudinal bar pieces 61 has front and rear end portions 615, 616 and a plurality of engaging portions 612 that are spaced apart from one another in the first direction. One of the terminal bar pieces 65 is connected to the front end portions 615 of the longitudinal bar pieces 61 through two front connecting members 68, and is adapted to be connected to and aligned with the front suspension mechanism 4 in a third direction transverse to the first and second directions. The other one of the terminal bar pieces 65 is connected to the rear end portions 616 of the longitudinal bar pieces 61 through two rear connecting members 69, and is adapted to be connected to and aligned with the rear suspension mechanism 5 in the third direction. At least a portion of each of the front connecting members 68 overlaps a respective one of the front end portions 615 of the longitudinal bar pieces 61 and said one of the terminal bar pieces 65 in the second direction. At least a portion of each of the rear connecting members 69 overlaps a respective one of the rear end portions 616 of the longitudinal bar pieces 61 and the other one of the terminal bar pieces 65 in the second direction.

In this embodiment, the front and rear connecting members 68, 69 are made from a solder material. The terminal bar pieces 65 are welded to the front and rear end portions 615, 616 of the longitudinal bar pieces 61 through the solder material. Alternatively, the terminal bar pieces 65 can be fastened to the front and rear end portions 615, 616 of the longitudinal bar pieces 61 through fasteners.

Each of the crossbar pieces 62 is connected to two aligned ones of the engaging portions 612 respectively of the two longitudinal bar pieces 61 which are aligned with each other in the second direction, and extends through the two aligned ones of the engaging portions 612 of the longitudinal bar pieces 61. Preferably, each of the crossbar pieces 62 is welded to the two aligned ones of the engaging portions 612 of the longitudinal bar pieces 61.

The terminal bar pieces 65 are symmetrically disposed. Each of the terminal bar pieces 65 has a U-shaped bar portion 651, two intermediate bar portions 652, and two connecting end portions 654. The intermediate bar portions 652 are disposed between the U-shaped bar portion 651 and the connecting end portions 654. The U-shaped bar portion 651 has two opposite ends 6511 that are opposite to each other in the second direction. For each of the terminal bar pieces 65, the connecting end portions 654 extend respectively from the intermediate bar portions 652 in the first direction. The connecting end portions 654 of said one of the terminal bar pieces 65 are welded respectively to the front end portions 615 of the longitudinal bar pieces 61, and the connecting end portions 654 of the other one of the terminal bar pieces 65 are welded respectively to the rear end portions 616 of the longitudinal bar pieces 61, through the solder material. Each of the intermediate bar portions 652 extends between and interconnects a respective one of the ends 6511 of the U-shaped bar portion 651 and a respective one of the connecting end portions 654. The intermediate bar portions 652 are opposite to each other in the second direction, and diverge from each other from the opposite ends 6511 of the U-shaped bar portion 651 to the connecting end portions 654.

Figure 9:
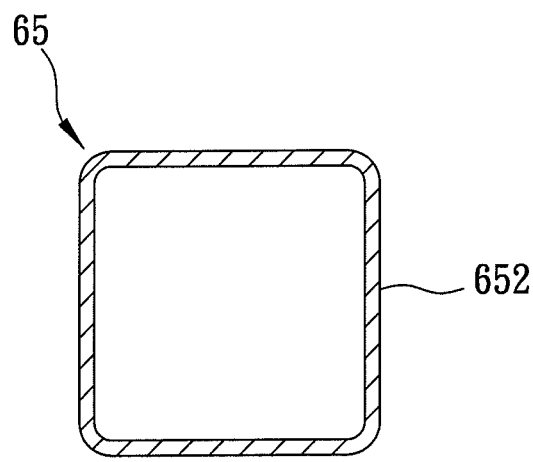
FIG. 9 is a sectional view taken along line IX-IX in FIG. 5.
Figure 10:
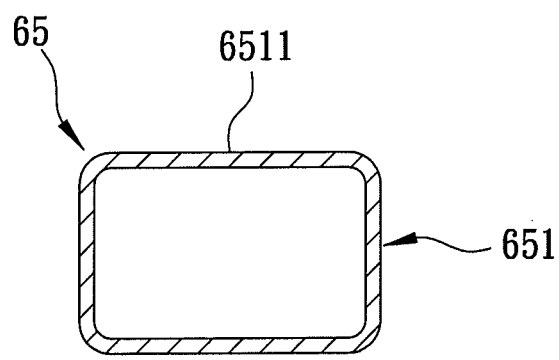
FIG. 10 is a sectional view taken along line X-X in FIG. 5.

In this embodiment, each of the intermediate bar portions 652 of each of the terminal bar pieces 65 has a cross-section (see FIG. 9) that is gradually increased from the respective one of the ends 6511 of the U-shaped bar portion 651 (see FIG. 10) to the respective one of the connecting end portions 654.

Each of the longitudinal bar pieces 61 is hollow. Each of the crossbar pieces 62 has two opposite engaging segments 621 that are disposed in the two aligned ones of the engaging portions 612 respectively of the two longitudinal bar pieces 61. Each of the connecting end portions 654 of said one of the terminal bar pieces 65 extends into the respective one of the front end portions 615 of the respective one of the longitudinal bar pieces 61 to engage a respective one of the engaging segments 621 of an adjacent one of the crossbar pieces 62. Each of the connecting end portions 654 of the other one of the terminal bar pieces 65 extends into the respective one of the rear end portions 616 of the respective one of the longitudinal bar pieces 61 to engage a respective one of the engaging segments 621 of an adjacent one of the crossbar pieces 62.

Figure 7:
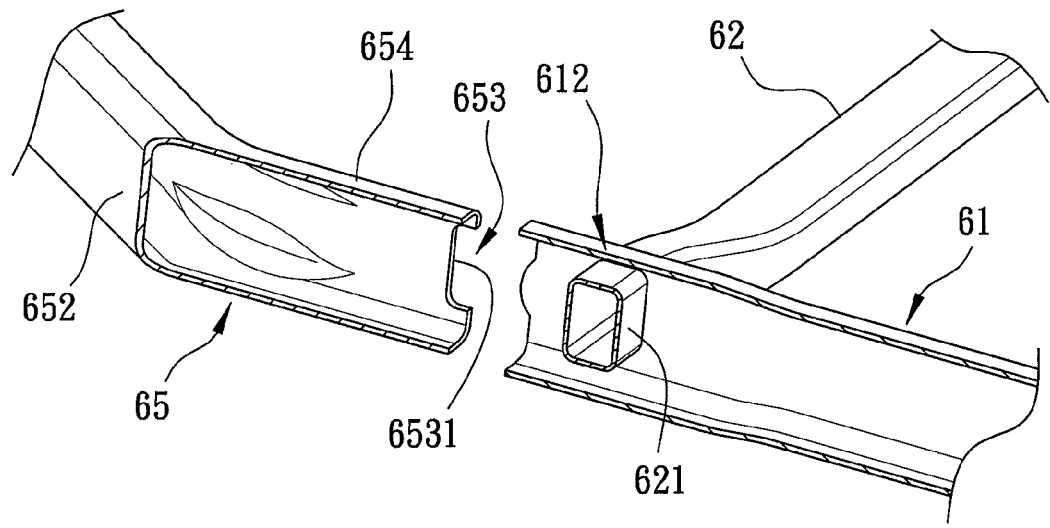
FIGS. 7 and 8 are cut away views illustrating how a terminal bar piece engages the crossbar piece of the preferred embodiment.
Figure 8:
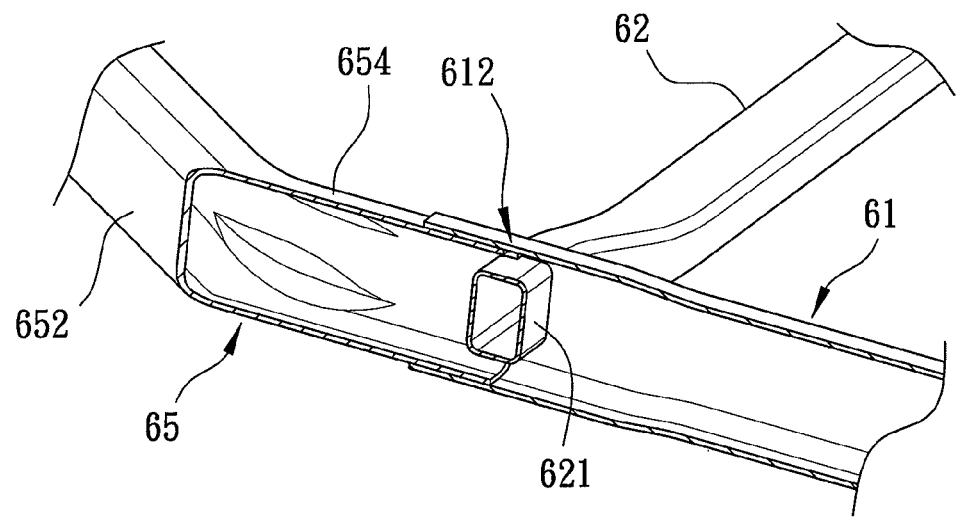

Referring to FIGS. 7 and 8, each of the connecting end portions 654 of each of the terminal bar pieces 65 is formed with an engaging recess 653 that is defined by a recessed edge 6531. The recessed edge 6531 of each of the connecting end portions 654 of each of the terminal bar pieces 65 clamps a respective one of the engaging segments 621 of an adjacent one of the crossbar pieces 62.

Figure 5:
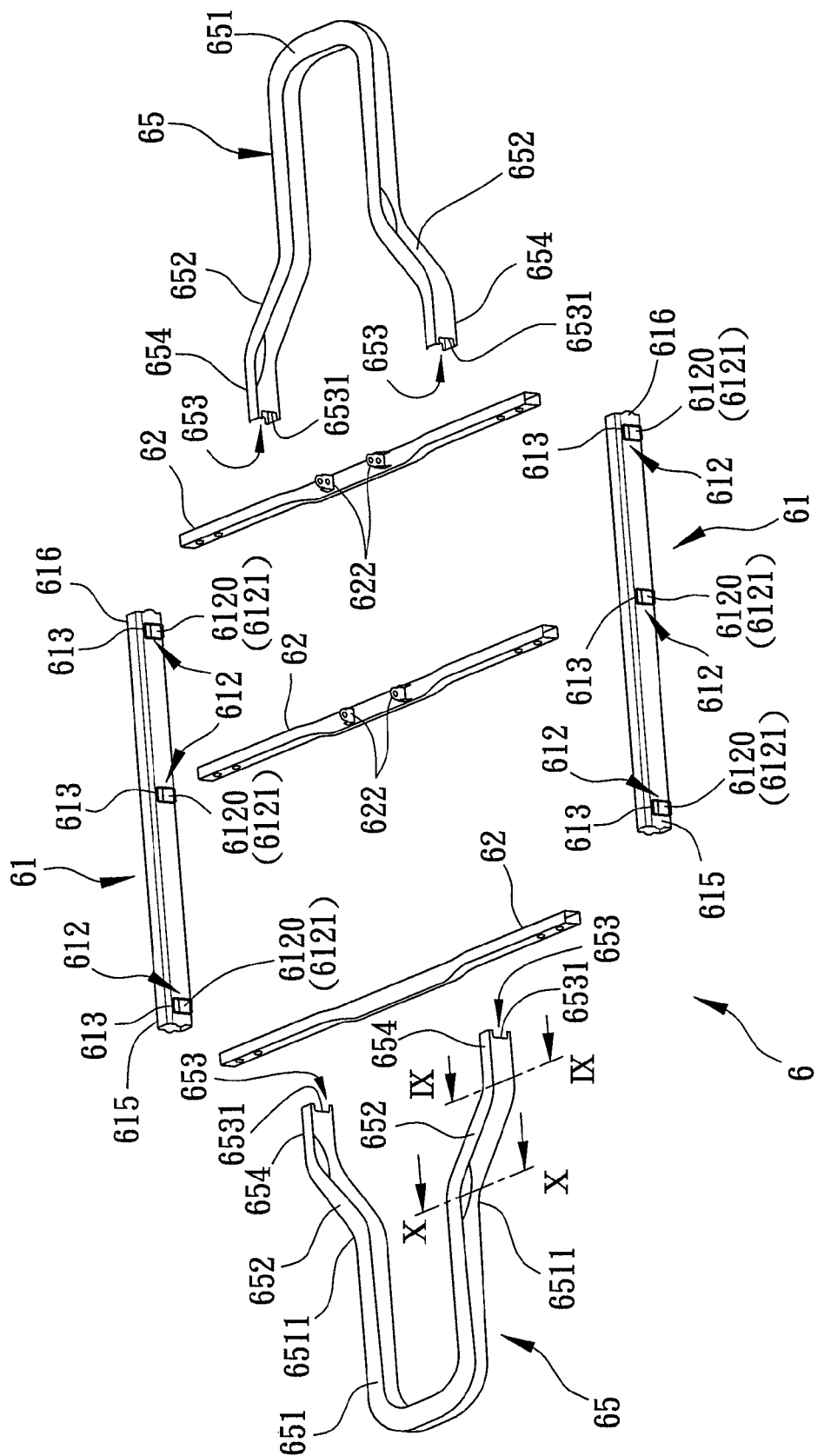
FIG. 5 is an exploded perspective view of the preferred embodiment.
Figure 6:
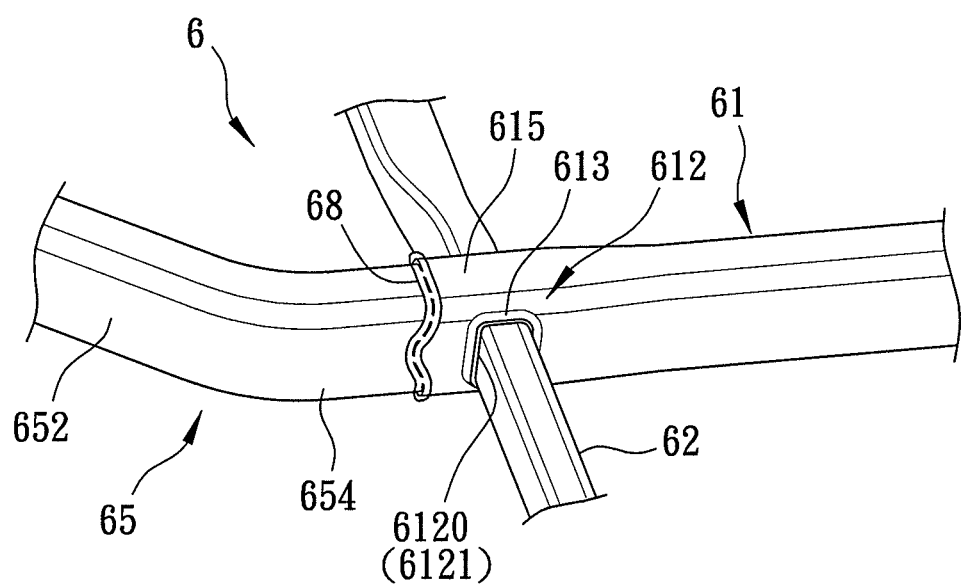
FIG. 6 is a fragmentary perspective view illustrating how a crossbar piece is connected to a longitudinal bar piece of the preferred embodiment.

Referring to FIGS. 5 and 6, each of the engaging portions 612 of each of the longitudinal bar pieces 61 has a through-hole 6120 that is defined by a hole-defining wall 6121, and is formed with a rim 613 that protrudes outwardly from the hole-defining wall 6121. Each of the crossbar pieces 62 extends through the through-holes 6120 in the two aligned ones of the engaging portions 612 of the longitudinal bar pieces 61, and tightly contacts the rims 613 that are formed on the two aligned ones of the engaging portions 612 of the longitudinal bar pieces 61.

Preferably, the number of the crossbar pieces 62 is not less than three. In this embodiment, the number of the crossbar pieces 62 is three, and two of them are respectively formed with a plurality of fasteners 622 thereon that are adapted for fastening an engine (not shown) thereto.

The longitudinal bar pieces 61, the terminal bar pieces 65 and the crossbar pieces 62 are preferably hydroformed using a conventional hydroforming machine.

Since hydroforming of the longitudinal bar pieces 61 (which extends linearly) is independent from hydroforming of the terminal bar pieces 65, and since different lengths of the longitudinal bar pieces 61 may be hydroformed using the same mold or die, the aforesaid drawback of requiring different sizes of the hydroforming molds or dies as encountered in the prior art maybe alleviated. In addition, since the terminal bar pieces 65 are identical in configuration, manufacturing of the same can be conducted using the same hydrofoming mold, which results in a reduction of the manufacturing costs as compared to the aforesaid conventional chassis frame part 13.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A modular vehicle chassis frame adapted to support front and rear suspension mechanisms of a vehicle, said modular vehicle chassis frame comprising:

two longitudinal bar pieces that extend linearly in a first direction and that are opposite to each other in a second direction which is transverse to the first direction, each of said longitudinal bar pieces having front and rear end portions and a plurality of engaging portions that are spaced apart from one another in the first direction;

two front connecting members;

two rear connecting members;

two terminal bar pieces, one of which is connected to said front end portions of said longitudinal bar pieces through said front connecting members and is adapted to be connected to and aligned with the front suspension mechanism in a third direction transverse to the first and second directions, and the other one of which is connected to said rear end portions of said longitudinal bar pieces through said rear connecting members and is adapted to be connected to and aligned with the rear suspension mechanism in the third direction, at least a portion of each of said front connecting members overlapping the respective one of said front end portions of said longitudinal bar pieces and said one of said terminal bar pieces in the second direction, at least a portion of each of said rear connecting members overlapping said rear end portions of said longitudinal bar pieces and said other one of said terminal bar pieces in the second direction; and a plurality of crossbar pieces that extend in the second direction, each of said crossbar pieces extending through two aligned ones of said engaging portions of said longitudinal bar pieces which are aligned with each other in the second direction;

wherein each of said terminal bar pieces has two connecting end portions, said connecting end portions of one of said terminal bar pieces being connected to said front end portions of said longitudinal bar pieces, respectively, said connecting end portions of the other one of said terminal bar pieces being connected to said rear end portions of said longitudinal bar pieces, respectively; and wherein each of said longitudinal bar pieces is hollow, each of said crossbar pieces having two opposite engaging segments that are disposed in said two aligned ones of said engaging portions of said longitudinal bar pieces, each of said connecting end portions of said one of said terminal bar pieces extending into the respective one of said front end portions of the respective one of said longitudinal bar pieces to engage a respective one of said engaging segments of an adjacent one of said crossbar pieces, each of said connecting end portions of said other one of said terminal bar pieces extending into the respective one of said rear end portions of the respective one of said longitudinal bar pieces to engage a respective one of said engaging segments of an adjacent one of said crossbar pieces.

2. The modular vehicle chassis frame of claim 1, wherein said front and rear connecting members are made from a solder material, said terminal bar pieces being welded to said front and rear end portions of said longitudinal bar pieces through said solder material.

3. The modular vehicle chassis frame of claim 1, wherein each of said terminal bar pieces further has a U-shaped bar portion and two intermediate bar portions, each of said intermediate bar portions being disposed between said U-shaped bar portion and a corresponding one of said connecting end portions, said U-shaped bar portion having two opposite ends that are opposite to each other in the second direction, said connecting end portions of said one of said terminal bar pieces extending from said intermediate bar portions in the first direction and being welded to said front end portions of said longitudinal bar pieces, respectively, said connecting end portions of said other one of said terminal bar pieces extending from said intermediate bar portions in the first direction and being welded to said rear end portions of said longitudinal bar pieces, respectively, each of said intermediate bar portions extending between and interconnecting a respective one of said ends of said U-shaped bar portion and a respective one of said connecting end portions, said intermediate bar portions being opposite to each other in the second direction and diverging from each other from said opposite ends of said U-shaped bar portion to said connecting end portions.

4. The modular vehicle chassis frame of claim 3, wherein each of said intermediate bar portions of each of said terminal bar pieces has a cross-section that is gradually increased from the respective one of said ends of said U-shaped bar portion to the respective one of said connecting end portions.

5. The modular vehicle chassis frame of claim 1, wherein each of said connecting end portions of each of said terminal bar pieces is formed with an engaging recess that is defined by a recessed edge, said recessed edge of each of said connecting end portions of each of said terminal bar pieces clamping a respective one of said engaging segments of an adjacent one of said crossbar pieces.

6. The modular vehicle chassis frame of claim 5, wherein each of said engaging portions of each of said longitudinal bar pieces has a through-hole that is defined by a hole-defining wall, and is formed with a rim that protrudes outwardly from said hole-defining wall, each of said crossbar pieces extending through said through-holes in said two aligned ones of said engaging portions of said longitudinal bar pieces, and contacting said rims that are formed on said two aligned ones of said engaging portions of said longitudinal bar pieces.

7. The modular vehicle chassis frame of claim 3, wherein at least one of said crossbar pieces is formed with a plurality of fasteners thereon that are adapted for fastening an engine thereto.

8. The modular vehicle chassis frame of claim 3, wherein said terminal bar pieces are identical in configuration.

9. The modular vehicle chassis frame of claim 3, wherein said crossbar pieces are not less than three in number.

10. The modular vehicle chassis frame of claim 3, wherein said longitudinal bar pieces, said terminal bar pieces and said crossbar pieces are hydroformed.

* * * * *